United States Patent [19]

Claussen et al.

[11] Patent Number: 4,900,492

[45] Date of Patent: Feb. 13, 1990

[54] HIGH-STRENGTH AND TEMPERATURE-STABLE FORMED BODIES OF ZIRCONIUM DIOXIDE

[75] Inventors: Nils Claussen; Helmut Schubert, both of Leonberg; Manfred Rühle, Ditzingen; Günter Petzow, Leinfelden-Echterdingen, all of Fed. Rep. of Germany

[73] Assignee: Max-Planck-Gesellschaft zur Foerderung der Wissenschaften e.V., Goettingen, Fed. Rep. of Germany

[21] Appl. No.: 157,101

[22] Filed: Feb. 9, 1988

Related U.S. Application Data

[63] Continuation of Ser. No. 722,299, Apr. 11, 1985, abandoned.

[30] Foreign Application Priority Data

Apr. 27, 1984 [DE] Fed. Rep. of Germany ....... 3415803

[51] Int. Cl.$^4$ ............................................. C04B 35/48
[52] U.S. Cl. ..................... 264/65; 501/103; 501/104; 501/105
[58] Field of Search ....................... 501/104, 105, 103; 428/325, 330, 404, 702; 264/65; 427/215

[56] References Cited

U.S. PATENT DOCUMENTS

| | | | |
|---|---|---|---|
| 3,083,123 | 3/1963 | Navias | 264/65 |
| 4,221,650 | 9/1980 | Friese et al. | 501/105 |
| 4,382,997 | 5/1983 | Henslee et al. | 428/702 |
| 4,525,464 | 6/1985 | Claussen et al. | 501/103 |
| 4,626,517 | 12/1986 | Watanabe et al. | 501/96 |

FOREIGN PATENT DOCUMENTS

| | | | |
|---|---|---|---|
| 129188 | 12/1984 | European Pat. Off. | 501/105 |
| 140638 | 5/1985 | European Pat. Off. | 501/104 |
| 2810134 | 9/1979 | Fed. Rep. of Germany | 501/103 |
| 14474 | 2/1981 | Japan | 501/104 |
| 32066 | 2/1983 | Japan | 501/105 |
| 111976 | 6/1984 | Japan | 501/104 |

*Primary Examiner*—Mark L. Bell
*Attorney, Agent, or Firm*—Felfe & Lynch

[57] ABSTRACT

The present invention provides a fine-grained ceramic formed body of 0.5 to 4 mole % rare earth oxide and 0.5 to 7 mole % MgO-containing $ZrO_2$, wherein the cubic granules thereof are coated with Mg-Al spinel particles.

The present invention also provides a process for the production of such formed bodies, wherein a $ZrO_2$ powder alloyed with rare earth oxide, which contains small amounts of $Al_2O_3$, is pressed and sintered in the presence of MgO at a temperature of from 1400° to 1600° C. and optionally subsequently tempered at a temperature of from 1200° to 1350° C.

7 Claims, No Drawings

HIGH-STRENGTH AND TEMPERATURE-STABLE FORMED BODIES OF ZIRCONIUM DIOXIDE

This application is a continuation, of application Ser. No. 722,299, filed Apr. 11, 1985, now abandoned.

The present invention is concerned with highstrength and temperature-stable formed bodies of zirconium dioxide and processes for the production thereof.

Partly stabilised zirconium dioxide (PSZ=partially stabilised zirconium) has long been known as a high-strength oxide ceramic with good wearing properties (see, for example, Stuhrhahn et al., Ber. Dt. Ker. Ges., 52, 59/1975 and R. C. Garvie et al., Nature, 258, 703/1975). As partly stabilising oxide additives, there are generally used MgO, CaO, $Y_2O_3$ and a number of rare earth oxides. published International Patent Application No. PCT/AY/83/00 (R. R. Hughan et al.), gives a survey of the methods of production of, in particular, MgO-partly stabilised $ZrO_2$ (Mg-PSZ) (see also U.S. Pat. No. 4,279,655). CaO-PSZ is, inter alia, described in Australian Patent Application No. 85680/1979. A further detailed survey of this class of work materials is given in the book "Science and Technology of Zirconia", "Advances in Ceramics", Vol. 3 (1981) and, in the middle of 1984, there appeared a second volume of this conference series, "Science and Technology of Zirconia II", "Advances in Ceramics", Vol. 11 (1984).

All the so-called PSZ ceramics suffer from the disadvantage of a relatively large granule size, granule sizes of from 50 to 100 $\mu$m. being usual. The result of this is that, in spite of the strengthening tetragonal phase separated out in cubic granules, the strength is small in comparison with the extremely fine-grained TZP ceramics (TZP: tetragonal zirconia polycrystals, granule size 0.1 to 0.2 $\mu$m.) (see in this regard, for example, M. Rühle, N. Claussen and A. H. Heuer, "Advances in Ceramics", Vol. 11 (1984) and M. Matsui et al., Am. Ceram. Soc., 17, 427/1982). The large granule size in the Mg- and Ca-PSZ ceramics is due to the fact that it is only possible to sinter or solution treat in the cubic single phase region at high temperatures (1700° C.) in the case of a relatively small stabiliser addition (for example 8 mole % CaO or MgO). Usually, after the sintering, in a tempering process at temperatures of from 1100° C. (see, inter alia, M. V. Swain et al., J. Am. Ceram. Soc., 66, 358/1983) to 1420° C. (see, inter alia, D. L. Porter and A. H. Heuer, J. Am. Ceram. Soc., 62, 298/1979), the tetragonal phase necessary for increasing the breaking strength is separated out.

As alternatives to the PSZ ceramics, there have been developed the TZP ceramics which, because of their very small granule size, achieve strengths of >1000 Mpa. They suffer from the great disadvantage that the tetragonal lattice form, stabilised by 3 to 4 mole % $Y_2O_3$ (or other rare earth oxides), is destabilised in aqueous solutions, moist air and other water vapour-containing atmospheres at temperatures of from 200° to 500° C. from the sample surface, due to which the strength is drastically reduced. A certain redress can here admittedly be achieved according to an older suggestion by means of a highly stabilised protective layer but the tetragonal (at low temperature metastable) granular form remains more susceptible to attack in aqueous or moist atmospheres than the cubic granular structure of the PSZ ceramics.

It is known that two-phase additives can prevent or reduce the granular growth (for example 0.1 to 1% MgO in $Al_2O_3$). However, such experiments in the case of PSZ ceramics have hitherto been unsuccessful because of the high sintering temperatures. Federal Republic of Germany Patent Specification No. 28 101 314 admittedly describes the addition of $Al_2O_3$ and of other $Al_2O_3$ compounds to cubic, fully stabilised $ZrO_2$ for solid body electrolytes by means of which a certain diminution of the granule size is said to be achieved. However, the granule sizes and the strengths correlatable therewith were not stated or were not measured. Furthermore, the high proportion by volume of $Al_2O_3$ (8 to 85%) given in this German Patent Specification would reduce the breaking strength ($K_{Ic}$) of the PSZ ceramics. Such an $Al_2O_3$-rich $ZrO_2$ would thus no longer fall under the PSZ ceramics but rather under the $Al_2O_3$-$ZrO_2$ ($ZrO_2$-strengthened $Al_2O_3$) described, for example, in Federal Republic of Germany Patent Specification No. 25 49 652.

Therefore, it is an object of the present invention to overcome the above-described disadvantages of the known rare earth oxide-containing ceramic formed bodies based on zirconium dioxide and to provide such formed bodies which are more fine-grained than the PSZ ceramics but, on the other hand, also display, in comparison with the TZP ceramics, an improved thermal stability in the region of 200° to 500° C. in moist surroundings and an improved high temperature strength.

Thus, according to the present invention, there is provided a fine-grained ceramic formed body of 0.5 to 4 mole % rare earth oxide- and 0.5 to 7 mole % MgO-containing $ZrO_2$, wherein the cubic granules thereof (crystallites) are coated by Mg-Al spinel particles ($MgAl_2O_4$).

Generally, the grain size is from 1 to 15 $\mu$m. The spinel particles result during the sinter process by the reaction of MgO with small amounts (about 0.1 to 5% by volume) of $Al_2O_3$ in the $Zr_2O$ powder. As rare earth oxide (RA oxide), $Y_2O_3$ is preferred. It can also be wholly or partly replaced by other RA oxides known as stabilising agents, such as $CeO_2$, $Gd_2O_3$, $La_2O_3$ or SrO.

The present invention is based on attempts to stabilise the surface of 3Y-TZP ceramics (TZP with 3 mole % $Y_2O_3$). Surprisingly, we found that in the case of diffusing MgO into a 3Y-TZP green body, $MgAl_2O_4$ (spinel) particles are formed on the TZP granule boundaries which prevent the grain growth of the MgO- and $Y_2O_3$-containing $ZrO_2$ ceramic during the heat treatment thereof (about 1500° C. in the air) and result in a strongly enmeshed particle boundary form. Further investigations showed that the $ZrO_2$ powder used for the TZP ceramic contained small amounts of $Al_2O_3$ (1% by volume) from the preparation process which, in turn, reacted with the diffused-in MgO to give Mg spinel. Electron microscopic investigations (STEM) showed that they were almost stoichiometric spinel particles with a diameter of about 0.1 $\mu$m.

The process according to the present invention for the production of the above-defined new formed bodies is, therefore, characterised in that a $ZrO_2$ powder alloyed with rare earth oxide, especially with $Y_2O_3$, which contains small amounts of $Al_2O_3$ is pressed and sintered in the presence of MgO at temperatures of from 1400° to 1600° C. and preferably of about 1500° C. and possibly subsequently tempered at a temperature of from 1200° to 1350° C. In general, the amount of $Al_2O_3$ is from about 0.1 to 5% by volume and preferably from 0.1 to 2% by volume.

the sintering in the presence of MgO can take place by admixing MgO with the ZrO₂ powder. Alternatively, it is also possible to sinter in an MgO-containing atmosphere.

According to an alternative embodiment, the $ZrO_2$ pressed body containing the rare earth oxide, especially $Y_2O_3$, and $Al_2O_3$ can first be sintered in the air at a temperature of from 1350° to 1450° C. and subsequently calcined in the MgO-containing atmosphere at a temperature of from 1450° to 1650° C. In the case of this modification of the production process, sintering can be carried out at temperatures which are up to 50° C. higher than the temperatures used for sintering in the presence of MgO.

The addition of $Al_2O_3$ to the $ZrO_2$ powder can take place in the powder production process, for example by coprecipitation, or also in the case of preparing the powder, for example by the wear of $Al_2O_3$ grinding bodies with which the $ZrO_2$ powder is finely ground.

Within the scope of the present invention, the MgO can also be used in the form of compounds which, at the sinter temperatures to be used, decompose with the formation of MgO. Typical examples of these include the readily decomposed magnesium salts, especially those with organic acids, for example magnesium acetate.

The production process according to the present invention can also be used for the production of PSZ covering layers on TZP and conventional PSZ ceramics The critical importance of the process conditions used according to the present invention is shown by the following experiments:

9 Mg-PSZ powder ($ZrO_2$ with 9 mole % MgO) was mixed with fine spinel or $Al_2O_3$ particles and, after an isostatic compression, sintered in the cubic onephase region (~1700° C.). Only an insignificant prevention of grain growth was hereby shown; furthermore, a coarsening of the dispersed spinel particles took place. Experiments in which pure $ZrO_2$ powder was mixed with $Al_2O_2$ (<2 vol.%), pressed and sintered in MgO powder led to similar results which were not very promising. Therefore, it is to be assumed that the reduction of the sintering temperature (from ~1700° to ~1500° C.) in the case of originally used $Y_2O_3$-containing powder was the decisive reason for the achievement of the fine-grained PSZ material.

In further investigations, $ZrO_2$ powder alloyed with 2 to 3 mole % $Y_2O_3$ was again mixed with small amounts of $Al_2O_2$ (0.1 to 2% by volume) and either mixed with MgO powder (or also magnesium acetate solution) or the pressed body was sintered in an MgO-containing atmosphere, for example in MgO-containing powder, at different temperatures and for different times. The bodies exclusively contained cubic grains with grain sizes of from 1 to 15 μm. with strongly enmeshed particle boundaries. The $MgAl_2O_4$ particles were dispersed not only within the Mg/Y-PSZ grains but also on the grain boundaries. A tempering treatment at ~1300° C. in the air led to the desired tetragonal depositions within the grains. It is assumed that the $Y_2O_3$-containing ZrO2 pressed bodies initially achieved the fine particularity and density usual for TZP in the tetragonal one-phase region and, during the further sintering time, is converted into a cubic crystal by the take-up of MgO, whereby, corresponding to the amount of $Al_2O_3$ present, spinel particles result by reaction with the MgO. In this way, the grain growth also present in the case of TZP ceramics is strongly limited in the case of sintering temperatures of >1500° C. During the cooling or after cooling and again tempering at temperatures of from 1100° to 1400° C., the tetragonal particles separated out from the cubic phase can be optimised, i.e. made capable of transformation.

the important advantages of the $ZrO_2$ ceramic according to the present invention in comparison with conventional Mg-PSZ or Ca-PSZ ceramics and the tetragonal Y-TZP ceramics are the following:

1. As a result of the fine grain size (1 to 15 μm.), the strength is greater than that of the coarse-grained (50 to 100 μm.) PSZ; this makes itself noticeable especially in the case of overpolished samples.

2. The $Y_2O_3$ content leads to an improved thermal stability at temperatures of >800° C., at which conventional Mg-PSZ becomes unstable due to MgO diffusion or loss.

3. The high temperature strength is markedly better in comparison with conventional PSZ, on the one hand as a result of the spinel particles present on the grain boundaries and, on the other hand, due to the marked enmeshment of the grain boundary indentation.

4. In comparison with the high strength TZP ceramics, thermal stability exists in the temperature range of from 200° to 500° C. in aqueous solutions, water-containing atmospheres and vapours.

5. The lower sintering temperatures are more favourable from the energy-technical point of view than the conventional PSZ ceramic production at the temperatures necessary therefor (about 1500° C. instead of ~1700° C.).

The ceramic bodies according to the present invention are, because of their above-described properties, especially suitable as constructional parts for heat energy machines, as bone replacement materials and as solid body electrolytes.

The following Examples are given for the purpose of illustrating the present invention on the basis of $ZrO_2$ formed bodies to which $Y_2O_3$ is added as rare earth oxide. However, as already mentioned, $Y_2O_3$ can also be replaced wholly or partly by other rare earth oxides, for example $CeO_2$, $Gd_2O_3$, $La_2O_3$ and the like or by SrO.

EXAMPLE 1

Green bodies pressed isostatically at 600 MPa from $ZrO_2$ powder containing 2.2 mole % $Y_2O_3$ and produced by coprecipitation, with 0.3% by weight of $Al_2O_3$ as impurity, were sintered in a powder bed of MgO and $ZrO_2$ (in equal amounts) at 1500° C. for 3 hours ad subsequently left for 5 hours at 1300° C. in the air. Thereafter, the structure consisted of strongly mutually enmeshed cubic grains with a size of from 5 to 10 m. in which and on the particle boundaries of which were uniformly dispersed small (~0.1 μm.) $MgAl_2O_4$ particles. The cubic grains contained tetragonal depositions.

The strength at ambient temperature was 810 MPa and at 1000° C. was 470 MPa (3-point support with 20 mm. distance). The $K_{IC}$ factor at ambient temperature (Vickers Enmeshment Test) was 12 MPa μm. After an autoclave test for 1 hour in 6 bar water vapour at 250° C., monoclinic material could not be ascertained in the surface region.

A material produced in similar manner but sintered in air with the MgO powder bed showed strong surface decomposition in the above-described autoclave test.

EXAMPLE 2

A $ZrO_2$ powder containing 2 mole % $Y_2O_3$ and produced by spray reaction was ground for 4 hours with $Al_2O_3$ balls, isostatically pressed to give formed bodies and sintered as in Example 1. The autoclave test again showed no surface decomposition. The Vickers $K_{IC}$ factor was 11 MPa μm.

EXAMPLE 3

A commercial $ZrO_2$ powder containing 3 mole % $Y_2O_3$ was mixed with 5 mole % MgO powder in an attrition device with $Al_2O_3$ balls for 4 hours. Green bodies isostatically pressed therefrom at 600 MPa were sintered in the air for 2 hours at 1550° C. Thereafter, the structure contained cubic grains with a diameter of 2 to 15 μm., which were surrounded by spinel particles (0.3 to 1 μm.). After a tempering calcination at 1280° C. for 6 hours, tetragonal depositions were formed. The $K_{IC}$ factor was 10.5 MPa μm. The autoclave test described in Example 1 did not result in any change to the surface of the sample.

EXAMPLE 4

A spray-reacted $ZrO_2$ powder containing 2 mole % $Y_2O_3$ and 2 mole % MgO was ground for 4 hours with $Al_2O_3$ balls, pressed isostatically at 600 MPa and sintered for 2 hours at 1550° C. in a $ZrO_2$ powder containing 20 mole % MgO and subsequently tempered at 1350° C. for 4 hours. The autoclave test described in Example 1 did not result in any surface change in the monoclinic $ZrO_2$ lattice form.

EXAMPLE 5

The powder from Example 1 was, as described in Example 1, pressed but first sintered in the air at 1400° C. for 1 hour and subsequently calcined for 2 hours at 1500° C. in a $ZrO_2$ powder bed containing 20 mole % MgO. Thereafter, there resulted an approximately 50 μm. wide external zone of the structure described in Example 1, whereas the inner region of the samples had a fine grained (~0.6 μm.) TZP structure. Here, too, the surface region was not damaged by the autoclave test described in Example 1.

We claim:

1. A process for the production of a formed body comprising: pressing a powder consisting essentially of $ZrO_2$ powder alloyed with 0.5 to 4 mole % rare earth oxide or SrO, which contains about 0.1 to 5% by volume of $Al_2O_3$, in the presence of MgO to form a pressed body; and sintering the pressed body in an MgO containing atmosphere at a temperature of from 1400° to 1600° C.

2. The process of claim 16 wherein the rare earth oxide is $y_2O_3$.

3. A process for the production of a formed body comprising: pressing a powder consisting essentially of $ZrO_2$ powder alloyed with 0.5 to 4 mole % rare earth oxide or SrO, which contains about 0.1 to 5% by volume of $Al_2O_3$, in the presence of MgO to form a pressed body; sintering the pressed body in air at a temperature of from 1350° to 1450° C. to form a sintered body; and, subsequently calcining the sintered body in an MgO-containing atmosphere at a temperature of from 1450° to 1650° C.

4. The process of claim 1 wherein the rare earth oxide is selected from the group consisting of $CeO_2$, $Gd_2O_3$, or $La_2O_3$.

5. The process of claim 1 wherein sintering is carried out at a temperature of about 1500° C.

6. The process of claim 1 wherein $Al_2O_3$ is added to the rare earth oxide-containing $ZrO_2$ powder either during powder production process or during grinding of the powder.

7. The process of claim 1 wherein the formed body is subsequently tempered at a temperature of from 1200° C. to 1350° C.

* * * * *

UNITED STATES PATENT AND TRADEMARK OFFICE
CERTIFICATE OF CORRECTION

PATENT NO. : 4,900,492
DATED : February 13, 1990
INVENTOR(S) : Nils Claussen et al It is certified that error appears in the above-identified patent and that said Letters Patent is hereby corrected as shown below:

Column 1, line 17, "published" should read --Published--.

Column 3, line 1, "the" (first occurrence) should read --The--.

Column 3, line 30, after "ceramics" insert --.--.

Column 3, line 61, "containing $ZrO_2$" should not be in italics.

Column 4, line 7, "the" (first occurrence) should read --The--.

Column 4, line 62, "$\mu$m" should read --$\sqrt{m}$--.

Column 5, line 8, "$\mu$m" should read --$\sqrt{m}$--.

Column 5, line 20, "$\mu$m" should read --$\sqrt{m}$--.

Column 6, line 15, "16" should read --1--.

Signed and Sealed this

Thirteenth Day of July, 1993

Attest:

MICHAEL K. KIRK

Attesting Officer    Acting Commissioner of Patents and Trademarks